United States Patent
Wells

(10) Patent No.: US 10,495,542 B2
(45) Date of Patent: Dec. 3, 2019

(54) MONITORING SYSTEM AND METHOD FOR A MULTIPLE-WALLED FLUID SYSTEM

(71) Applicant: Rolls-Royce Deutschland Ltd & Co KG, Blankenfelde-Mahlow (DE)

(72) Inventor: Paul Julian Wells, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 148 days.

(21) Appl. No.: 15/648,056

(22) Filed: Jul. 12, 2017

(65) Prior Publication Data
US 2018/0149550 A1 May 31, 2018

(30) Foreign Application Priority Data

Nov. 30, 2016 (EP) .................... 16201507

(51) Int. Cl.
*G01M 3/28* (2006.01)
*B67D 7/32* (2010.01)
(Continued)

(52) U.S. Cl.
CPC .......... *G01M 3/283* (2013.01); *B67D 7/3209* (2013.01); *F16L 9/18* (2013.01); *F16L 11/20* (2013.01);
(Continued)

(58) Field of Classification Search
CPC ..... G01M 3/283; G01M 3/3263; F17D 5/005; B67D 7/3209; F16L 11/20; F16L 9/18; F16L 2201/30
See application file for complete search history.

(56) References Cited

U.S. PATENT DOCUMENTS 3,830,290 A * 8/1974 Thamasett .......... G01M 3/3227
165/70
4,644,780 A 2/1987 Jeter
(Continued)

FOREIGN PATENT DOCUMENTS

DE 4417624 A1 12/1995
FR 2553886 A1 4/1985
(Continued)

OTHER PUBLICATIONS

European Search Report dated May 19, 2017 for counterpart European Application No. 16201507.7.

*Primary Examiner* — Xin Y Zhong
(74) *Attorney, Agent, or Firm* — Shuttleworth & Ingersoll, PLC; Timothy J. Klima

(57) ABSTRACT

A monitoring system for a multiple-walled fluid system with a first walled region including a flowing or stagnant fluid and at least one second walled region at least partially surrounding the first walled region. The first walled region and the at least one second walled region forming the multiple-walled fluid system, the first walled region being in fluid communication with the at least one second walled region, the at least one second walled region also being in fluid communication with the ambient environment. A data processing device for monitoring at least one pressure difference between a pressure in at least one a control volume and at least one second pressure in the at least one second walled region, a first control volume in fluid connection with the first walled region and the ambient environment. The at least one pressure difference indicating the status of the multiple-walled fluid system.

19 Claims, 3 Drawing Sheets

(51) Int. Cl.
*F16L 9/18* (2006.01)
*F16L 11/20* (2006.01)
*F17D 5/00* (2006.01)
*G01M 3/32* (2006.01)

(52) U.S. Cl.
CPC .......... *F17D 5/005* (2013.01); *G01M 3/3263* (2013.01); *F16L 2201/30* (2013.01)

(56) References Cited

U.S. PATENT DOCUMENTS 5,067,094 A * 11/1991 Hayes ................... G01M 3/002
340/605
2016/0160635 A1* 6/2016 Langseth .............. G01M 3/283
73/40.5 R

FOREIGN PATENT DOCUMENTS

| KR | 20160001590 U | 5/2016 |
|----|---------------|--------|
| WO | WO9000698 A1 | 1/1990 |

* cited by examiner

MONITORING SYSTEM AND METHOD FOR A MULTIPLE-WALLED FLUID SYSTEM

REFERENCE TO RELATED APPLICATION

This application claims priority to European Patent Application No. 16 201 507.7 filed on Nov. 30, 2016, the entirety of which is incorporated by reference herein.

BACKGROUND

The invention relates to a monitoring system for a multiple-walled fluid system and a monitoring method for a multiple-walled fluid system.

Double-walled fluid systems—as simple form of a multiple-walled fluid system—are commonly used in many applications, e.g. in heat-transfer devices. In many instances the double-walled fluid systems are deeply embedded in some other system so that the integrity of the double-walled fluid system is difficult to monitor.

SUMMARY

Therefore, monitoring systems and methods for an effective check e.g. for failures, in particular dormant failures are required.

This is addressed by a monitoring system with features as described herein.

The monitoring system is intended for a multiple-walled fluid system with a first walled region comprising a flowing or stagnant fluid and at least one second walled region at least partially surrounding the first walled region, the first walled region and the at least one second walled region. These regions are forming a multiple-walled fluid system.

The first walled region is in fluid communication with the at least one second walled region, the at least one second walled region also being in fluid communication with the ambient environment, in particular via a fluid connection with a further second walled region.

The monitoring system comprises a data processing device for monitoring at least one pressure difference between a pressure in at least one control volume and at least one second pressure in the at least one second walled region. A first control volume is in fluid connection with the first walled region and the ambient environment, in particular via fluid connections through a further control volume. If e.g. two second walled regions are present, two control volumes are required to define pressure differences of the pressure in the walled regions, against the control volumes.

Now the at least one pressure difference is indicating the status of the multiple-walled fluid system, in particular the mechanical integrity of at least one of the walled regions. If e.g. a wall in the multiple-walled fluid system rupture, the pressures shift and hence the measured pressure differences determined against the control volume. The use of pressure differences enables the cancellation of ambient pressure changes.

In one embodiment of the monitoring system the fluid communications have a defined flow resistance which is defining the static and dynamic pressure values in the regions and the control volume. In particular the fluid communications are formed by fluid conduits, in particular holes introducing a flow resistance for the fluid flowing through the fluid conduits.

In one embodiment first walled region is surrounded by only one second walled region forming a double-walled fluid system. It is also possible to use the monitoring system with a double-walled pipe system, a jacketed vessel system or a gearbox system. In all those systems different fluid volumes are present and pressure differences can be defined against a control volume.

The determination of the pressure difference is simplified if the volumes of at least one control volume and the volume of the at least one second walled regions have the same size. Otherwise the dynamics of the system have to be taken into account.

Furthermore, it is possible that a control signal is generatable by the data processing device in dependence of the at least one first pressure difference between the pressure in the at least one control volume and at least one second pressure in the at least one second walled region.

The control signal can e.g. be used to shut off a fluid flow after a mechanical failure has been found.

It is possible and in certain cases required that the data processing device includes the dynamics of the fluid flow and/or the pressure values in the at least one second region and/or the at least one control volume. If e.g. one pressure values raises faster than the other, this might indicate a specific failure mode.

The monitoring system can be used in a turbo engine, in particular an aircraft engine.

The issue is also addressed by a monitoring method with features as described herein.

In one embodiment of the method the data processing device uses the dynamics of the fluid flow in the at least one second region and the at least one control volume to determine the status of the multiple-walled fluid system. Alternatively or in addition it is possible that the data processing device generates a control signal in dependence of the at least one determined pressure difference.

BRIEF DESCRIPTION OF THE DRAWINGS

Embodiments of the invention are shown in the figures, where.

DETAILED DESCRIPTION

Figure 1:
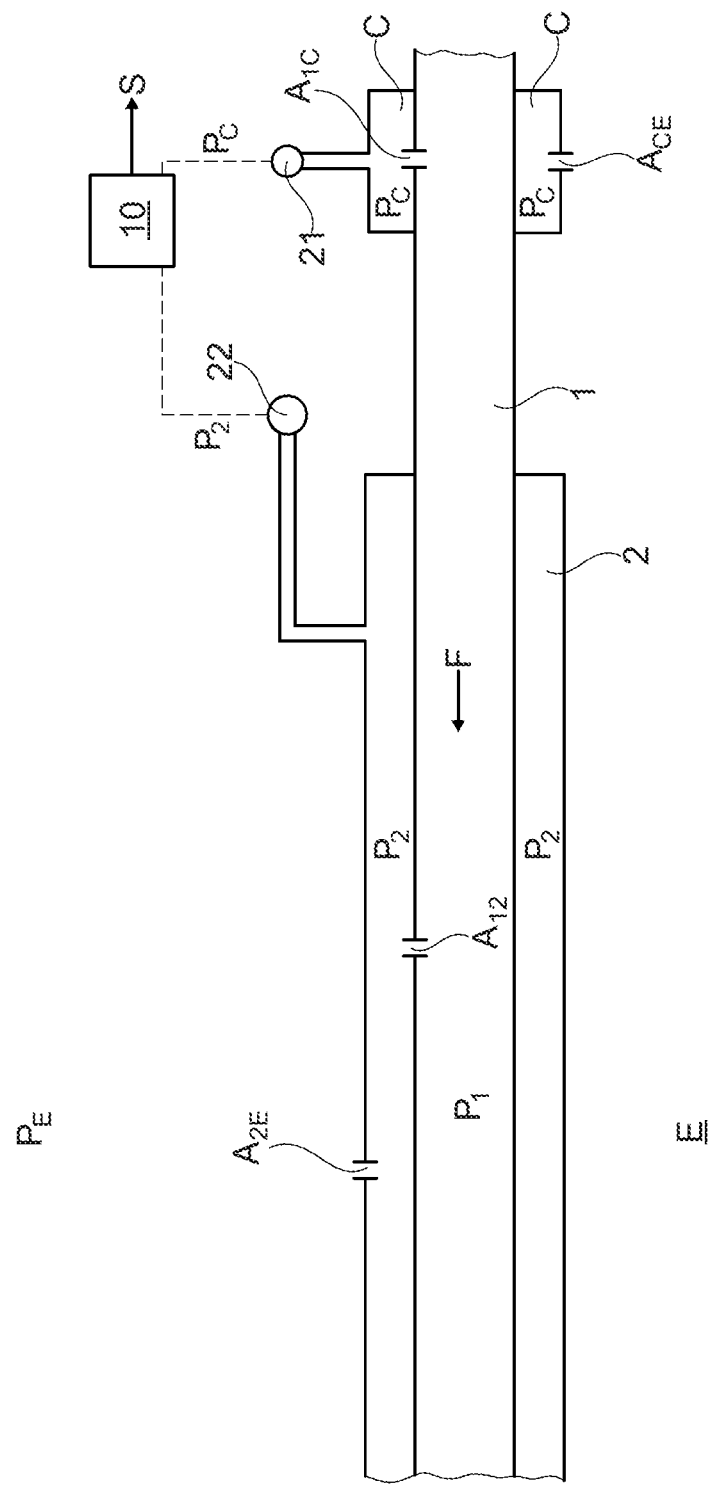
FIG. 1 shows a schematic view of a first embodiment of a monitoring system for a double-walled pipe fluid system.

In FIG. 1 a section of a double-walled pipe system is shown as an example of a multiple-walled fluid system.

The double-walled fluid system has an inner pipe, i.e. a first walled region 1. A fluid F flows through the first walled region 1 in the direction indicated by the arrow. At least a part of the first walled region 1 is surrounded by second walled region 2. In the embodiment shown the second walled region 2 is forming a jacket for the first walled region 1 which is sealed at its ends. In FIG. 1 only the right hand end of the second walled region 2 is shown.

A double-walled fluid flow system shown in FIG. 1 can be e.g. used in a de-icing system in an aircraft, in particular a hot air pipe for de-icing the intake of an aircraft engine.

The main purpose of the double-walled construction in this embodiment is the prevention of damage to the structure in the event of a large leakage.

In the following an embodiment of a monitoring system is described which checks on disruptions to the normal operation of the fluid system. The monitoring is based on the detection of at least one pressure difference which would be influenced by a disruption in the mechanical structure of the fluid system. Under nominal operation the pressure difference has a predefined value, e.g. zero. Any deviation from that predefined value would indicate some excursion from the nominal operating conditions.

The pressure difference is influenced or determined by fluid conduits A12, A2E, A1C, ACE, e.g. holes in the walls of the regions 1, 2 and a control volume C, connecting different parts of the fluid systems with each other and with the environment E.

A first fluid conduit A12 allows limited fluid communication between the first walled region 1 (i.e. the inner pipe) and the surrounding second walled region 2.

A second fluid conduit A2E allows limited fluid communication between the second walled region 2 and the environment E.

The size of the fluid conduits A12, A2E is chosen to allow a relatively small fluid flow through them resulting in partial pressurization of the second walled region 2. This assumes that the pressure p1 in the first walled region 1 is higher than the pressure p2 in the second walled region 2. The ambient pressure pe of the environment is assumed to be smaller than the pressure in the second walled region 2.

In a similar manner a control volume C is provided which is in fluid communication with the first walled region 1 and the environment E.

A third fluid conduit A1C allows limited fluid communication between the first walled region 1 (i.e. the inner pipe) and the control volume C.

A fourth fluid conduit ACE allows limited fluid communication between the control volume C and the environment E.

The small flow of fluid exhausting from holes A2E or ACE may be allowed to escape, for example when the fluid is air, or may be collected by drains pipes (not shown) and returned to a reservoir or safely disposed of.

If we assume that the volume of the control volume C and the volume of the second walled region 2 have the same size and the fluid conduits A12, A2E, A1C, ACE have the same flow characteristics, the pressure pc in the control volume C and the pressure p2 in the second walled region 2 should be the same. The pressure difference pc−p2 would be zero.

The control volume C can be a dedicated feature. In FIG. 1 the control volume extends around the first walled region 1 in a jacket-like manner. The control volume C could also be an additional section of the double-walled pipe, as long as it is not directly connected with the first walled region 1. In an alternative embodiment the control volume C could be a self-contained, replaceable device combining the control volume C, the holes and an attached sensor (see below). If it is a replaceable device it could also in the form of a calibrated instrument to be used for periodic inspections instead of providing continuous monitoring.

The pressure pC of the control volume C is measured by a first pressure sensor 21. The pressure p2 of the second walled region 2 is measured by second pressure sensor 22.

A data processing device 10, e.g. a computer or a microcontroller receives the pressure measurements of the pressure sensors 21, 22 and computes the difference between the pressures pC and p2. The value of the pressure difference is indicative of the status of the fluid system. If e.g. some of the walls of the regions 1, 2 are ruptured, the measured pressure difference will deviate from a predetermined value, as will be discussed in the following.

Under the assumption that the sizes of the control volume C and volume of the second region 2 are identical, the pressure measured by the sensors 21, 22 should be equal within a tolerance band. If the signals differ then it indicates that the flow path has changed.

If the pressure p2 of the second walled region 2 is lower than the pressure pC in the control volume C then an additional fluid flow is escaping from second walled region 2 indicating a rupture of the outer wall of the double-walled fluid system.

If the pressure p2 of the second walled region 2 is higher than the pressure pC in the control volume then an additional fluid flow is entering the second walled region 2 indicating a rupture of the inner wall of the double-walled fluid system.

A deviation from the nominal pressure difference may also indicate a failure of the control volume C. In any event, the monitoring system indicates either a failure of the pipe or a failure of the detection. It is possible to apply signal processing to the pressure vs time signal. In one embodiment a relatively rapid change in Pc while P2 remains constant would indicate the failure is in the control volume C and not in the double-wall region.

The embodiment shown uses the defined flow resistances due to the fluid conduits A12, A2E, A1C, ACE to recreate pressure levels which can be detected and eventually a pressure difference can be determined. When a pressure difference is used in the monitoring, changes in the ambient pressure—as can e.g. happen in an aircraft engine—cancel out.

The deviation from the nominal—i.e. balanced pressures—can be used by the data processing device 10 to generate a control signal S which can automatically close a valve (not shown in FIG. 1) to stop a fluid flow due to a detected failure.

The monitoring system uses a disturbance of a pressure balance at nominal operation as an indicator for a mechanical failure in the fluid flow system.

Separate pressure sensors 21, 22 allow for eliminating dormant failure.

Alternative embodiments are possible. For example the difference between the volume pressures could be measured by a further pressure sensor, which should indicate zero differential pressure unless there is a failure. Similarly, the pressure difference could be used to directly control an upstream valve such that when there is a failure the valve is made to close.

If the control volume C and the second walled region 2 are not identical in size, the transient behavior (i.e. the dynamics) of the double-walled fluid system needs to be considered.

If control volume C and second walled region 2 are of different sizes then there will be a time delay between the two volumes reaching the equilibrium pressure; the larger volume will take longer to reach equilibrium. The time delay can be measured or computed from a model. The result can be tabulated and stored e.g. in the data processing device 10.

This time delay must be considered when reading the pressure signals. Sufficient time must be allowed for both volumes to reach equilibrium before the sensor readings are processed. However if this transient behavior is characterized it can also be used as a means of avoiding sensor dormant failure whilst only using a single sensor. With a single sensor, a "healthy" system would always give an output of zero in steady-state conditions, therefore at least two sensors 21, 22 are needed to detect a dormant failure. However, if the volumes are different and the time taken to reach steady state is different for the two volumes, then this will lead to a "healthy" system giving a non-zero output on a single sensor for a short duration. A failed sensor would not respond to this difference and such lack of response would therefore show the sensor has failed, thus avoiding the possibility of a dormant failure.

The monitoring system described above can be used for other fluid systems in which a flow passes through the double-walled fluid system. A typical application of the monitoring system would be jacketed heat exchangers or shell-and-tube heat exchangers.

Figure 2:
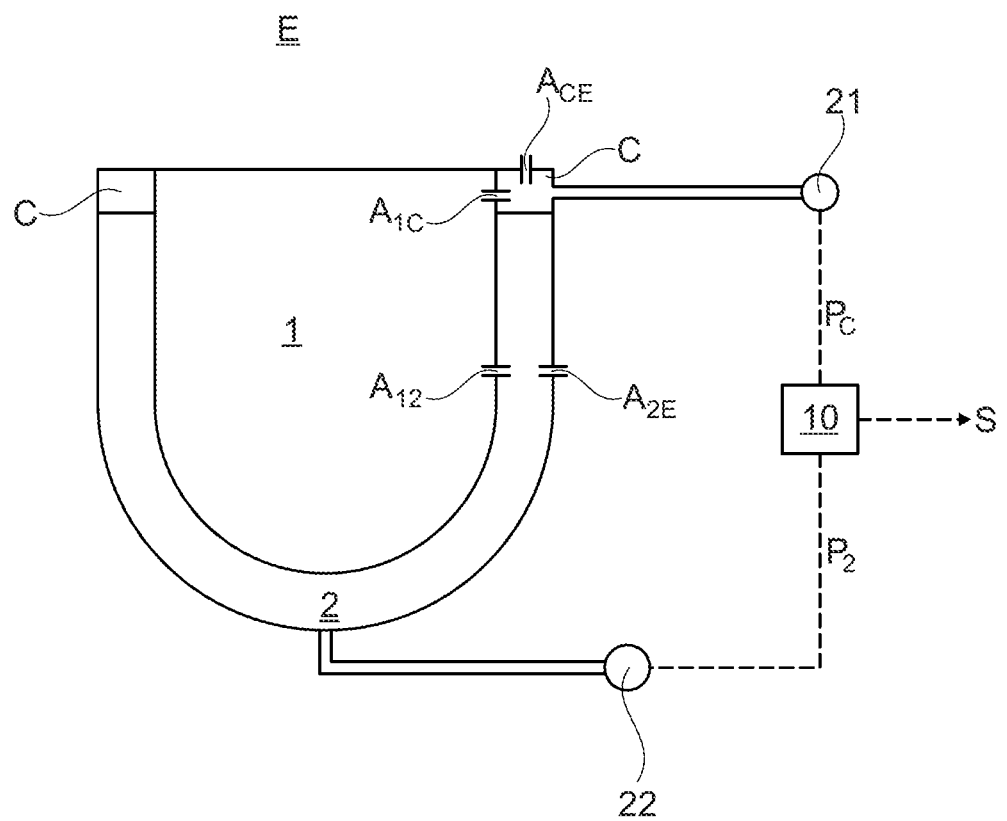
FIG. 2 shows a schematic view of a second embodiment of a monitoring system for a double-walled fluid system with a stagnant fluid.

In FIG. 2 a double-walled fluid system with a stagnant, i.e. non-flowing fluid F is described. In the embodiment shown, a jacketed reactor is forming the double-walled vessel system. The reactor space (i.e. the vessel) is the first walled region 1. This is the region a reaction usually takes place. A jacket forms the second walled region 2 which partially surrounds the first walled region 1. The control volume C is located at the upper rim of the reactor, the volume of the control volume C being smaller than that of the second walled region 2.

As mentioned above, in this context, the time-lag due to the different pressurization times has to be taken into account.

As in the first embodiment, the fluid conduits, here holes A12, A2E, A1C, ACE, connect the first walled region 1 with the control volume C and the second walled region 2, and the control volume C and the second walled region 2 with the environment E.

The pressures pC, p2 of the control volume C and the second walled region 2 are measured by the pressure sensors 21, 22. The pressure difference is computed by the data processing device 10. If e.g. the pressure difference pC-p2 (taking into account the dynamics of the system due to difference volumes) suddenly increases, this could be due to a fall in the pressure in the second walled region 2, most likely a rupture of the outer wall.

The principle of using a control volume with regions in a double-walled fluid system can e.g. be applied to (partly) fluid filled systems like a gearbox (forming a vessel) in which there is a defined fluid pressure, i.e. oil pressure. The gearbox can be surrounded by a second walled region 2.

Figure 3:
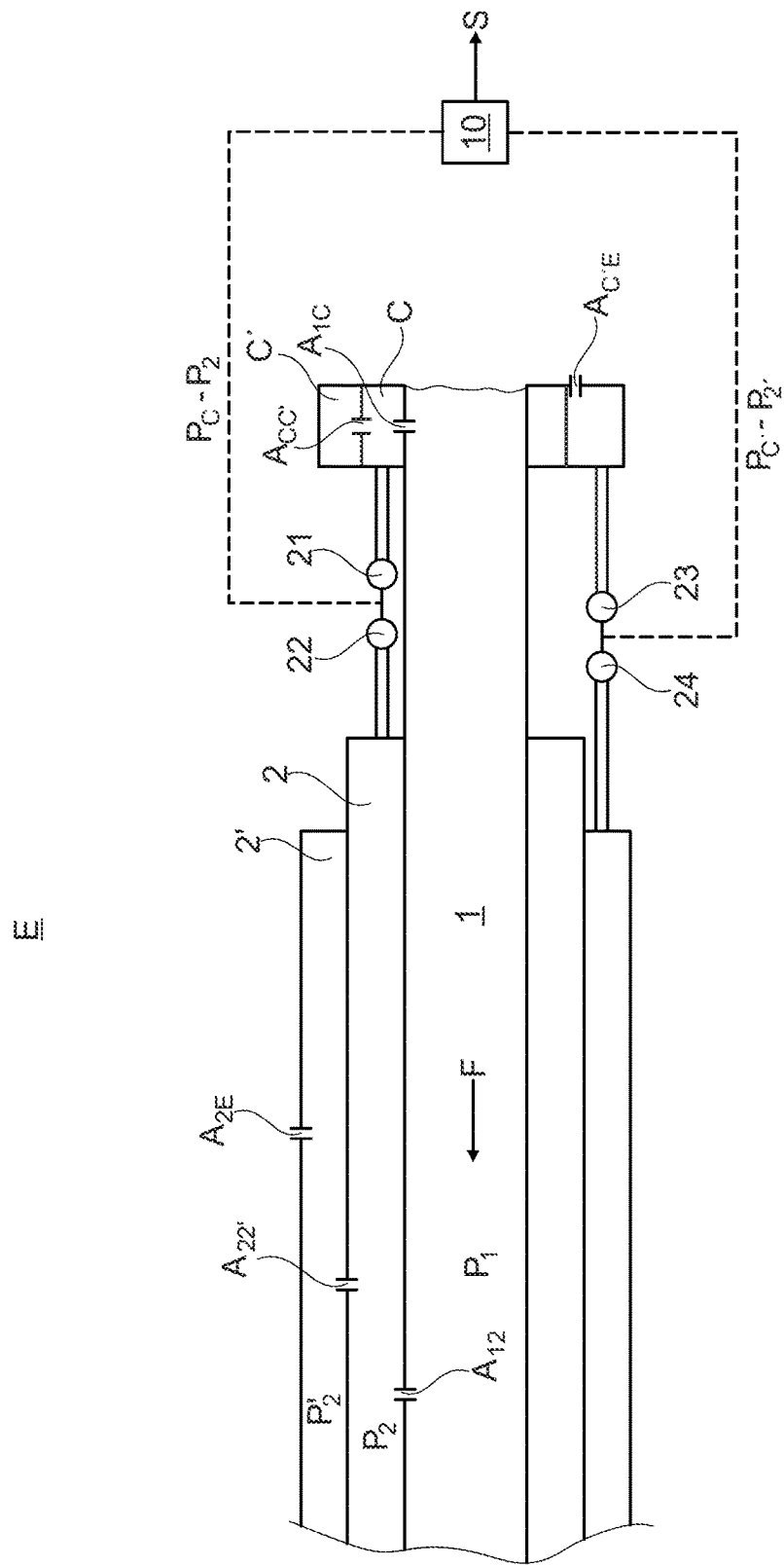
FIG. 3 shows a schematic view of a third embodiment of a monitoring system of a triple-walled pipe fluid system.

The principle demonstrated with the embodiments according to FIGS. 1 and 2 can be extended to multiple-walled fluid system. In FIG. 3 a variation of the first embodiment of a triple-walled pipe system is shown. Here the first walled region 1 is concentrically surrounded by two second walled regions 2, 2'. The fluid conduits A12, A22', A2'E connect the first walled region 1, the second walled region 2, a further second walled region 2' and the Environment E in a similar way as described in connection with the embodiment shown in FIG. 1.

The two control volumes C, C' are in fluid communication A1C, ACC', AC'E with the first walled region 1 and the environment E in a similar way as described in connection with the embodiment shown in FIG. 1.

The data processing device 10 is now determining two pressure difference. One pressure difference (pC-p2) between the first control volume C and the second walled region 2. The other pressure difference (pC'-p2') between the second control volume C' and the further (i.e. here the outer walled region) walled region 2'. The pressure differences are formed between associated pressures in the walled region 2, 2' and their respective control volumes C, C'. The walled regions 2, 2' and the control volumes C, C' are arranged in sequence, i.e. there is flow from the first walled region 1 to the environment E through the regions 2, 2' or respective volumes C, C'.

As in the other two embodiments, a change of the measured pressure differences is an indication of a failure in one of the walls.

Here four pressure sensors 21, 22, 23, 24 are shown. The pressure sensor for the pressure pC can be one single pressure sensor.

LIST OF REFERENCE NUMBERS

1 first walled region
2 second walled region
2' further second walled region
10 data processing device
21 first pressure sensor
22 second pressure sensor
23 third pressure sensor
24 fourth pressure sensor
$A_{12}$ first fluid conduit between first walled region and second walled region
$A_{2E}$ second fluid conduit between second walled region and environment
$A_{22'}$ fluid conduit between two second walled regions
$A_{1C}$ third fluid conduit between first walled region and the control volume
$A_{CE}$ fourth fluid conduit between the control volume and the environment
$A_{CC'}$ fluid conduit between a first control volume and a second control volume
$A_{C'E}$ fluid conduit between a second control volume and the environment
C first control volume
C' second, further control volume
E environment
F Fluid
$p_1$ pressure in first walled region
$p_2$ pressure in second walled region
$p_{2'}$ pressure in further second walled region
$p_C$ pressure in first control volume
$P_{C'}$ pressure in second control volume
$p_E$ ambient pressure
S control signal

The invention claimed is:

1. A monitoring system for a multiple-walled fluid system, the monitoring system comprising:
    a multiple-walled fluid system comprising:
        a first walled region comprising a flowing or stagnant fluid;
        an inner second walled region, wherein the inner second walled region at least partially surrounds the first walled region, and wherein the first walled region is in fluid communication with the inner second walled region;
        wherein the inner second walled region is in fluid communication with an ambient environment; and
        a first control volume, wherein the first control volume is in fluid communication with the first walled region and the ambient environment; and
    a data processing device for monitoring a pressure difference between a pressure of the first control volume and a pressure of the inner second walled region, and wherein the pressure difference indicates a mechanical integrity of the multiple-walled fluid system.

2. The monitoring system according to claim 1, further comprising a plurality of fluid connectors arranged to provide fluid communication between at least two chosen from the first walled region, the inner second walled region, the ambient environment, and the first control volume, and wherein the plurality of fluid connectors have a defined flow resistance.

3. The monitoring system according to claim 2, wherein the plurality of fluid connectors are formed by a plurality of bores which provide the defined flow resistance.

4. The monitoring system according to claim 1, wherein the first walled region is surrounded by the inner second walled region forming a double-walled fluid system.

5. The monitoring system according to claim 1, wherein the multiple-walled fluid system is one chosen from a double-walled pipe system, a jacketed vessel system and a gearbox system.

6. The monitoring system according to claim 1, wherein a volume of the first control volume equals a volume of the inner second walled region.

7. The monitoring system according to claim 1, wherein the data processing device includes a processor, wherein the processor is configured to emit a control signal in dependence of the pressure difference between the pressure of the first control volume and the pressure of the inner second walled region.

8. The monitoring system according to claim 1, wherein the data processing device is configured to take at least one measurement chosen from a fluid flow and a pressure value of at least one chosen from the inner second walled region and the first control volume.

9. An aircraft engine including a monitoring system according to claim 1.

10. The monitoring system according to claim 1, the multiple-walled fluid system further comprising an outer second walled region, wherein the inner second walled region is in fluid communication with the ambient environment via fluid communication with the outer second walled region.

11. The monitoring system according to claim 10, the multiple-walled fluid system further comprising a second control volume, wherein the first control volume is in fluid communication with the ambient environment via fluid communication with the second control volume.

12. The monitoring system according to claim 11, further comprising a plurality of fluid connectors arranged to provide fluid communication between at least two chosen from the first walled region, the inner second walled region, the outer second walled region, the ambient environment, the first control volume, and the second control volume, and wherein the plurality of fluid connectors have a defined flow resistance.

13. The monitoring system according to claim 1, the multiple-walled fluid system further comprising a second control volume, wherein the first control volume is in fluid communication with the ambient environment via fluid communication with the second control volume.

14. A monitoring method for a multiple-walled fluid system comprising:
providing a multiple-walled fluid system comprising:
a first walled region comprising a flowing or stagnant fluid;
an inner second walled region, wherein the inner second walled region at least partially surrounds the first walled region, and wherein the first walled region is in fluid communication with the inner second walled region;
wherein the inner second walled region is in fluid communication with an ambient environment; and
a first control volume, wherein the first control volume is in fluid communication with the first walled region and the ambient environment;
measuring a pressure difference between a pressure of the first control volume and a pressure of the inner second walled region with a data processing device; and
determining a status of the multiple-walled fluid system from the pressure difference, wherein the status of the multiple-walled fluid system is a mechanical integrity of the multiple-walled fluid system.

15. The monitoring method according to claim 14, further comprising:
measuring at least one chosen from a fluid flow and a pressure value of at least one chosen from the inner second walled region and the first control volume using the data processing device to determine the status of the multiple-walled fluid system.

16. The monitoring method according to claim 14, further comprising:
generating a control signal with the data processing device in dependence of the pressure difference.

17. The monitoring method according to claim 14, the multiple-walled fluid system further comprising an outer second walled region, wherein the inner second walled region is in fluid communication with the ambient environment via fluid communication with the outer second walled region.

18. The monitoring method according to claim 17, the multiple-walled fluid system further comprising a second control volume, wherein the first control volume is in fluid communication with the ambient environment via fluid communication with the second control volume.

19. The monitoring method according to claim 14, the multiple-walled fluid system further comprising a second control volume, wherein the first control volume is in fluid communication with the ambient environment via fluid communication with the second control volume.

* * * * *